Patented Aug. 9, 1949

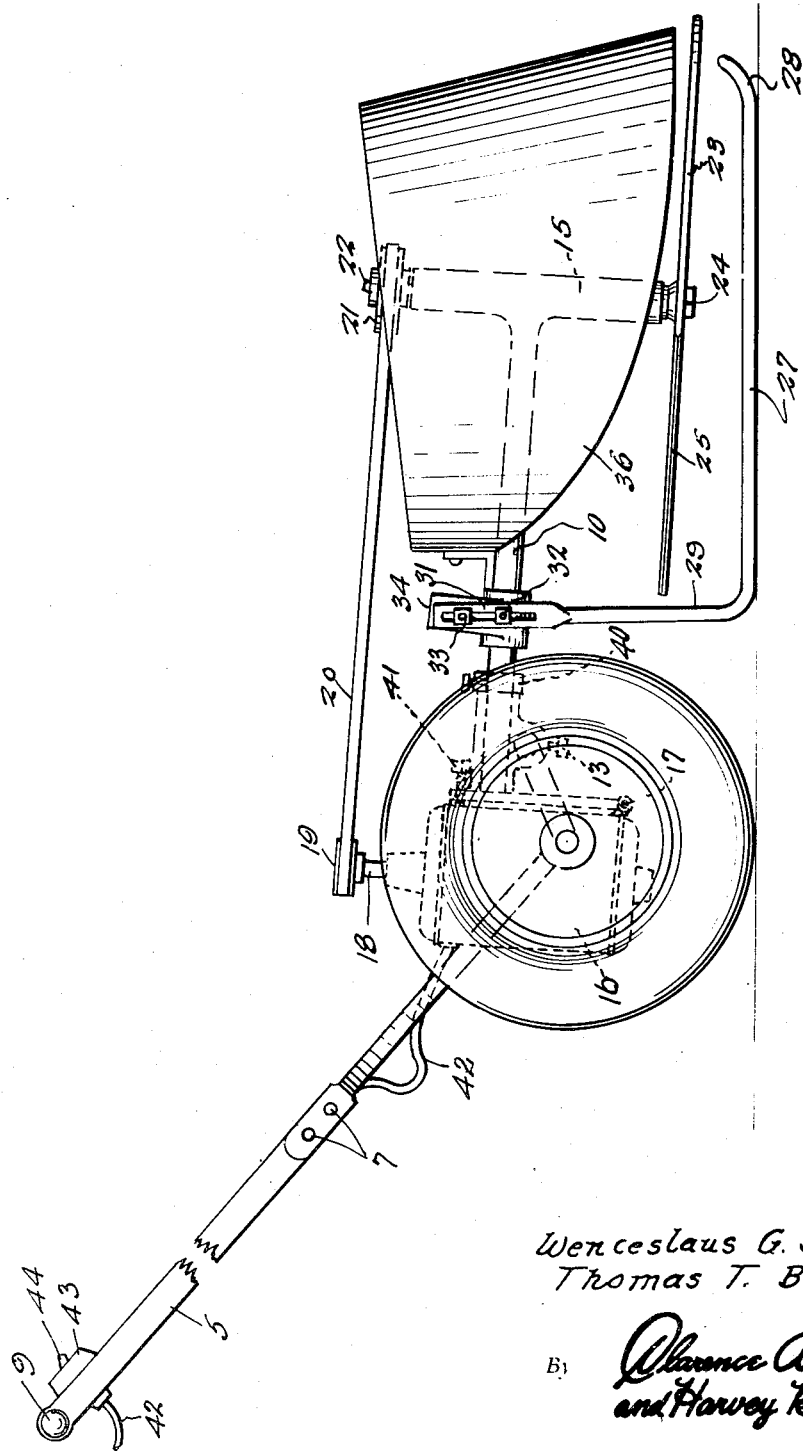

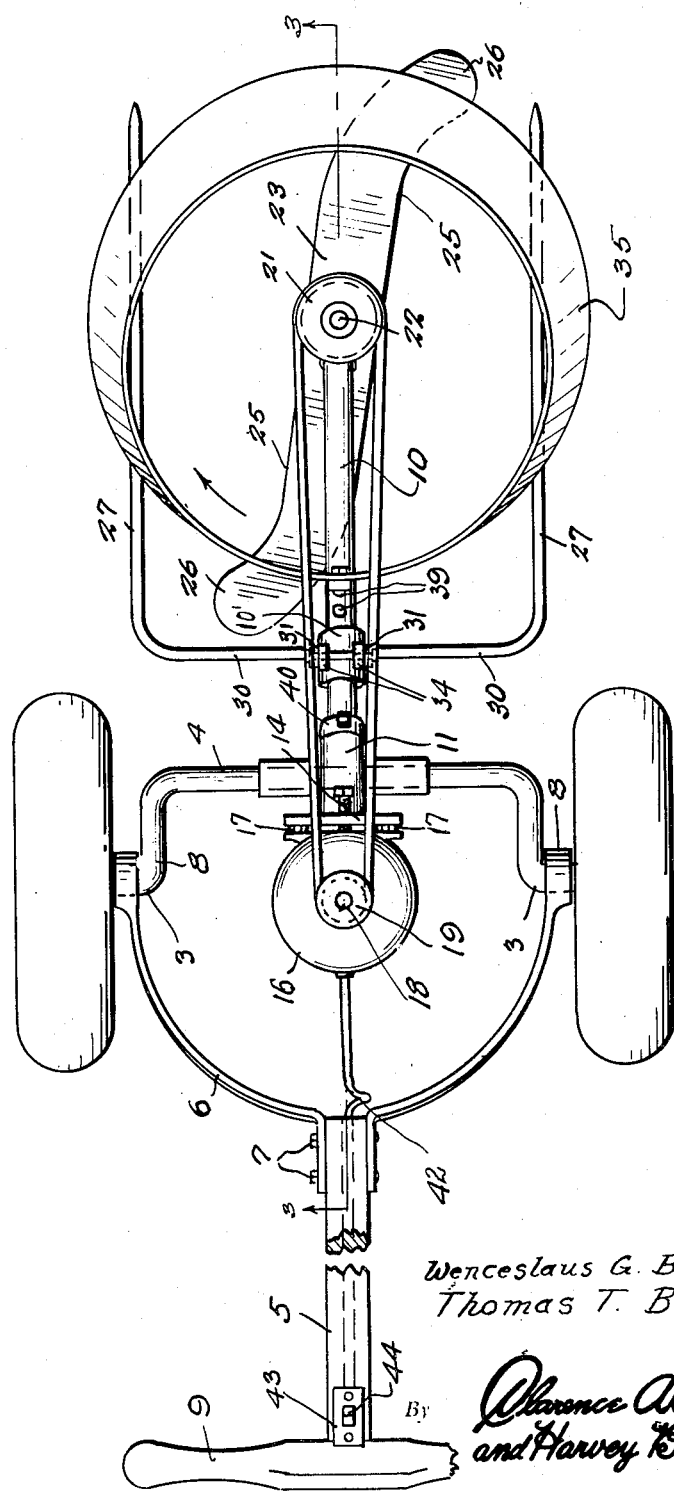

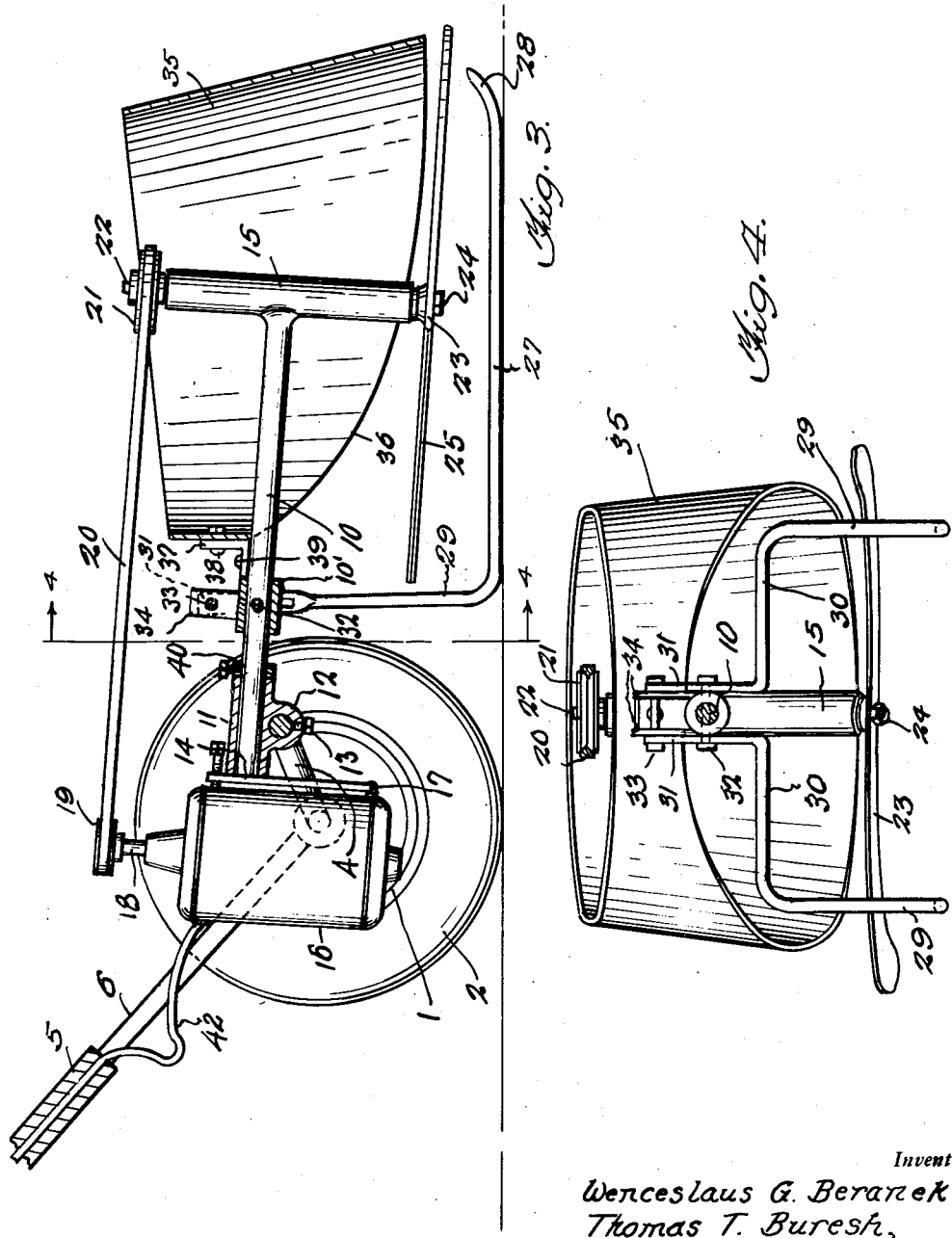

2,478,558

UNITED STATES PATENT OFFICE 2,478,558

LAWN MOWER

Wenceslaus G. Beranek and Thomas T. Buresh, Touhy, Nebr.

Application April 18, 1945, Serial No. 588,932

2 Claims. (Cl. 56—25.4)

Our invention relates to improvements in lawn-mowers; the primary object in view being to provide a rotary straight cutter blade mower adapted to cut lawns evenly and cleanly regardless of uneven ground, and which is easy to propel by hand, power-operated as regards cutting, simple in construction, and comparatively inexpensive to manufacture and service.

Other and subordinate objects, also comprehended by our invention, together with the precise nature of our improvements, and the manifold advantages thereof, will be readily understood when the succeeding description and claims are read with reference to the drawings accompanying and forming part of this specification.

In said drawings:

Figure 1 is a view in side elevation of our improved lawnmower in a preferred embodiment thereof, Figure 2 is a view in plan, Figure 3 is a view in longitudinal vertical section taken on the line 3—3 of Figure 2, and Figure 4 is a view in transverse section taken on the line 4—4 of Figure 3.

Reference being had to the drawings by numerals, in the preferred, illustrated embodiment thereof, our improved lawnmower comprises a pair of ground wheels 1, preferably equipped with pneumatic tires 2, and mounted on stub axles 3 on a forwardly arched axle bar 4. A handle bar 5 for pushing the mower is rigidly mounted on the stub axles 3, in any suitable manner, by means of a curved yoke-forming bar 6, having rear ends bolted, as at 7, to opposite sides of said handle bar 5, and front eye-like ends 8 preferably fixed on said stub axles 3. The usual hand grip bar 9 extends across the end of the handle bar 5.

A motor and cutter blade supporting rock shaft 10 extends across the axle bar 4, forwardly and rearwardly thereof, and in the transverse center of the same, and is journaled in a tubular sleeve 11 also extending across said bar 4 and mounted thereon for swinging adjustment about the same into different set positions by means of a bottom bearing 12 on said sleeve through which said bar 4 extends, and a set bolt 13 extending through said bearing 12 to said bar 4. The rock shaft 10 is formed, at its rear end, with an upright cross bar 14 longer below said shaft 10 than above the same. At the front end thereof, the rock shaft 10 is provided with an upright cross sleeve 15. The purpose of the cross bar and cross sleeve 15 will presently appear.

An electric motor 16, of any suitable type, is hinged at one end, as at 17, to the lower end of the cross bar 14 with its armature shaft 18 extending upwardly above said bar 14 and the rock shaft 10 and provided with a belt pulley 19 thereon.

A belt 20 extends forwardly from the pulley 19 to a larger pulley 21 fast on the upper end of a cutter blade spindle 22 journaled in upright position in the cross sleeve 15 on the front end of the rock shaft 10.

A cutter blade 23 is fixed, intermediate its ends, on the lower end of the cutter blade spindle 22 by a nut 24. The cutter blade 23 is provided with cutting edges 25 extending half-way along the opposite sides thereof and with curved ends 26 curving in the direction of rotation of said blade, indicated by the arrow in Figure 2, to facilitate attaining a sickle-like cutting action.

A pair of rod-like, ground-engaging runners 27 support the rock shaft 10 forwardly of the axle bar 4 and space the cutter blade 23 above the ground, as shown in Figure 3. The runners 27 each comprises an upturned front end 28, and a right angled rear end shank extending upwardly, as at 29, and then inwardly, as at 30, toward the rock shaft 10 and terminating in an upstanding, vertically slotted bar 31. The bars 31 are adjustably clamped to opposite sides of the rock shaft 10, in front of the sleeve 11, by a bolt 32 extending through the bars 31 and through a sleeve 10' on said rock shaft 10, and a second bolt 33 extending through said bars 31 and through a pair of upstanding lugs 34 on the sleeve 10'. As best shown in Figure 2, the runners 28 are disposed equidistantly upon opposite sides of the axis of rotation of the cutter blade 23. Also, as will be seen, the runners 28 are vertically adjustable by means of the slotted bars 31 and bolts 33, 34 to vary the height of the cutter blade 23 from the ground, for high or close cutting operations.

An annular, preferably sheet metal guard 35 surrounds the cross sleeve 15, above the cutter blade 23, to function as a fender for fending weeds, branches and the like away from said cutter blade. For this purpose, the guard 35 is formed with a lower edge 36 inclining downwardly and forwardly close to the cutter blade 23. At its rear side, said guard 35 rests on the rock shaft 10 in front of the lugs 34 and is fixed to said shaft 10 by an angle bracket 37 bolted to the guard 35 and to the rock shaft 10, as at 38, 39.

A set collar 40 on the rock shaft 10, together with the cross bar 14, confine the rock shaft 10 in the sleeve 11 against endwise movement.

A set screw 41 in the upper end of the cross bar 14 bearing against the motor 16, at its upper end, provides for swinging said motor rearwardly to take up slack in the belt 28 and to prevent the motor 16 from vibrating on the hinge 17.

A power lead cable 42 to the motor 16 extends through the handle bar 5 longitudinally to a suitable plug-in box 43 provided with a switch 44 and for connection to an electric power line, not shown.

The manner in which the described mower is operated will be readily understood. With the motor 16 running, the mower is pushed along the ground, the runners 27 gliding over the ground to place the cutter blade 23 so as to mow at a uniform height, regardless of uneven ground, or travel of the ground wheels 2 over humps and hollows, the rock shaft 10 oscillating in the sleeve 11 to permit the runners 27 to always engage the ground and thereby prevent the cutter blade 23 from being tilted by such uneven travel of the ground wheels. As will be clear, the weight of the rock shaft 10 and the parts carried thereby forwardly of the axis of the ground wheels 1 overbalances said rock shaft 10 to maintain the runners 27 on the ground. The arched axle bar 4 provides a crank arm facilitating tilting of the runners 27 upwardly off the ground, by downward pressure on the handle bar 5, when it is desired to propel the mower, without mowing, and in turning the same around. As shown in the drawings, it is preferable that the cutter blade 23 inclines forwardly and downwardly slightly to cut in front of the axis of rotation thereof. The motor 16, it will be noted, is suspended, in greater part, below the axis of the rock shaft 10 to counterweight said shaft so as to cause the runners 27 to hug the ground.

The foregoing will, it is believed, suffice to impart a clear understanding of our invention without further explanation.

Manifestly, the invention, as described, is susceptible of modification without departing from the inventive concept, and right is herein reserved to such modifications as fall within the scope of the appended claims.

What we claim is:

1. In a lawnmower, a cross-bar adapted for mounting a pair of ground wheels on the ends thereof, a bearing on said cross-bar, a rock shaft extending substantially horizontally across said cross-bar and journalled in said bearing for oscillation therein, a sleeve on one end of said shaft perpendicular to the same, a rotatable spindle journalled in said sleeve with ends extending out of the ends of the sleeve and adapted for attachment of a cutter blade to one end thereof, a pair of runners fixed to said shaft to engage the ground and oscillate the shaft when running over uneven ground to thereby adjust the sleeve and spindle into a position perpendicular to the ground, and a motor operatively connected to the other end of the spindle and mounted on the other end of said shaft with its major portion disposed below the axis of the shaft whereby said motor tends to counterbalance the shaft against oscillation to thereby maintain the runners engaged with the ground.

2. In a lawnmower, a cross-bar adapted for mounting a pair of ground wheels on the ends thereof, a bearing on said cross-bar, a rock shaft extending substantially horizontally across said cross-bar and journalled in said bearing for oscillation therein, a sleeve on one end of said shaft perpendicular to the same, a rotatable spindle journalled in said sleeve with ends extending out of the ends of the sleeve and adapted for attachment of a cutter blade to one end thereof, a pair of runners fixed to said shaft to engage the ground and oscillate the shaft when running over uneven ground to thereby adjust the sleeve and spindle into a position perpendicular to the ground, and a motor operatively connected to the other end of the spindle and mounted on the other end of said shaft with its major portion disposed below the axis of the shaft whereby said motor tends to counterbalance the shaft against oscillation to thereby maintain the runners engaged with the ground, said operating connections comprising a belt and pulley drive between the motor and said spindle, the mounting for the motor being pivotal and said motor overbalanced on said mounting to swing under the influence of gravity in a direction to tighten the belt and pulley drive.

WENCESLAUS G. BERANEK.
THOMAS T. BURESH.

REFERENCES CITED

The following references are of record in the file of this patent:

UNITED STATES PATENTS

| Number | Name | Date |
|---|---|---|
| 1,189,519 | Word | July 4, 1916 |
| 1,202,472 | Binford | Oct. 24, 1916 |
| 2,167,222 | Shelor | July 25, 1939 |
| 2,253,452 | Urschel | Aug. 19, 1941 |

FOREIGN PATENTS

| Number | Country | Date |
|---|---|---|
| 498,393 | Great Britain | Jan. 6, 1939 |